J. R. GAMMETER.
CUSHION TIRE.
APPLICATION FILED OCT. 20, 1921.

1,410,669. Patented Mar. 28, 1922.

Inventor
John R. Gammeter.
By Robert M. Pierson
Atty.

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

CUSHION TIRE.

1,410,669. Specification of Letters Patent. Patented Mar. 28, 1922.

Original application filed June 11, 1920, Serial No. 388,090. Divided and this application filed October 20, 1921. Serial No. 508,969.

*To all whom it may concern:*

Be it known that I, JOHN R. GAMMETER, a citizen of the United States, residing at Akron, in the county of Summit and State of Ohio, have invented a certain new and useful Cushion Tire, of which the following is a specification.

This invention relates to cushion tires and particularly to such as comprise a tire-body of rubber recessed from its inner periphery and secured to an annular metal base. Its objects are to provide an improved cushion tire and more particularly a tire which may be made by simple manufacturing methods, which will have good adhesion between the cushion and the base, and improved seating contact of the base with the permanent rim or felly band.

This application is a division of my application Serial No. 388,090, filed June 11, 1920.

Figure 1:
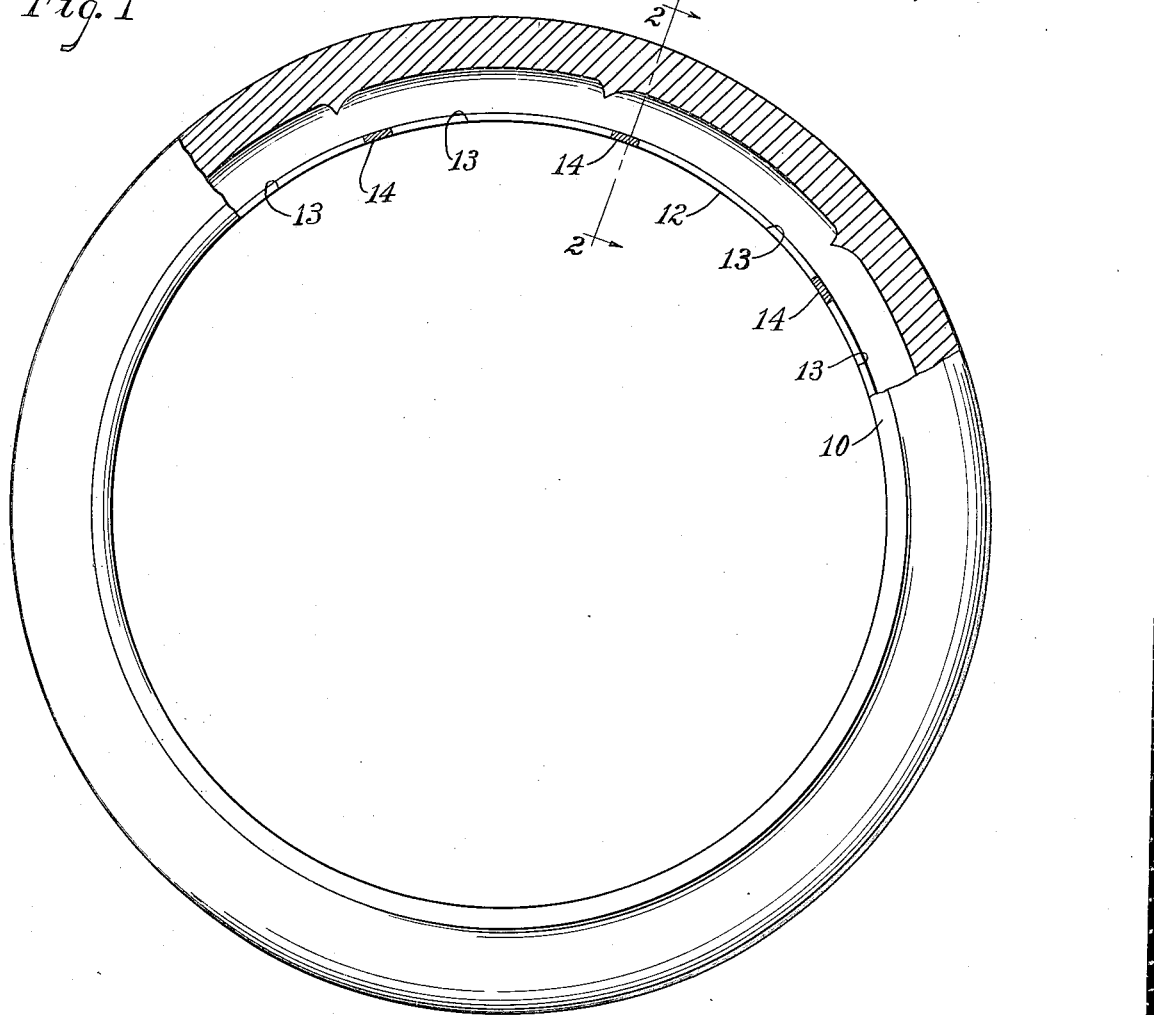
Fig. 1 is a side elevation, partly in longitudinal section, showing a preferred embodiment of my improved tire.
Figure 2:
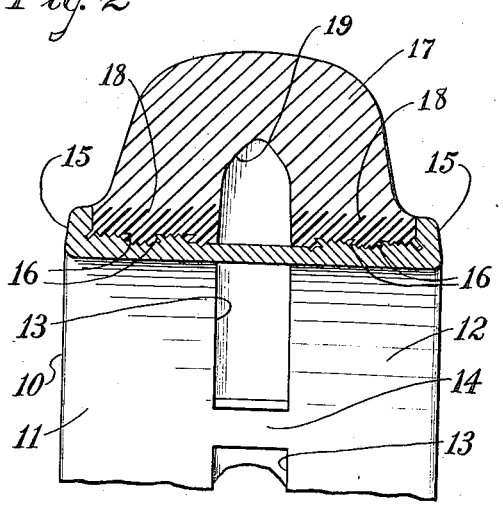
Fig. 2 is a section on the line 2—2 of Fig. 1.

Referring to the drawings, 10 is an annular metal base or rim of a general cylindrical form, divided into two annular side portions or members 11, 12, by a circumferentially aligned series of longitudinal slots, 13, 13, said slots alternating with narrow cross-webs or bridges 14, 14 which connect the side members 11, 12 and act as spacing means therefor. Preferably, these bridges are integral with the side members as shown, and they serve as cross-ties preventing separation of said members. The base 10 is provided with integral side flanges 15, 15 and the side members 11, 12 are formed with dove-tailed grooves 16, 16 for anchoring the legs of a hollow tire-body or cushion of rubber 17 thereon, the latter consisting in part of a foundation layer of hard-rubber compound 18 interlocking with the grooves 16 of the base 10, while the rest of the cushion is of soft rubber vulcanized to said hard rubber layer. 19 is the cavity within the tire-body, here shown as a complete annular cavity.

In manufacturing the tire I prefer to assemble with the base 10 a sectional core comprising arcuate sections adapted to be mounted in the slots 13, one end of each section overlapping one of the bridges 14, as described in my aforesaid application, Serial No. 388,090. The tire-body, including the foundation layer 18 may then be built up, as by winding strips of sheeted stock upon the base and core, and after vulcanization of the tire in a suitable mold the core sections may be withdrawn through the slots 13 from the tire-body 17, leaving the annular channel 19 in communication with said slots. A tire having a rim with a cylindrical inner periphery as here shown is mounted in pressed-on relation, upon the permanent rim of a wheel, the bridges 14 serving as spacing means between the side members 11, 12 of the base 10. As the bridges are to some extent flexible, they permit the side members 11, 12 to accommodate themselves to the seating surface of the permanent rim even though the latter be somewhat imperfect as to form, and an improved seating of the tire is thus obtained. Ventilation of the interior of the cushion tire-body is also obtainable through the slots 13 between the bridges, and either through the felly if appropriately constructed or between the base and felly-band. The tire combines the advantages of a cushion or hollow tire, particularly as to resilience, with those of a tire having an integral metal base with the tire-body vulcanized thereon, and in these several ways presents a highly improved article.

It will be understood that the demountable base or rim 10, and the felly-band or permanent rim may be complementally formed in any well-known or suitable manner to provide a different form of mounting than the pressed-on type, and that other modifications may be made within the scope of my invention.

I claim:

1. A cushion-tire structure comprising a unitary, integral base or rim formed with a circumferentially-disposed series of perforations, and a cushion of rubber permanently vulcanized on said base and recessed from its inner periphery over said perforations.

2. A cushion-tire structure comprising a base including a pair of side-members having rubber-locking portions and a series of independent, cross-tying bridges connecting said members at intervals around their circumference and a rubber body recessed from its inner periphery and permanently vulcanized on the base, said body having an outer cushion part and an inner hard-rubber part interlocked with the rubber-locking portions of the rim.

3. A cushion tire structure comprising a metal base formed with longitudinal slots separated by bridges, and a rubber body vulcanized on said base and channeled in communication with said slots.

4. A cushion tire structure comprising a metal base formed with openings therethrough, and an arched rubber body vulcanized on said base and having a substantially continuous annular channel in communication with said openings.

5. A metal base for a cushion tire, said base comprising annular members formed with rubber-locking portions, and a series of cross-tying bridges connecting said members at intervals around their circumference.

6. A cushion-tire base comprising a metal ring formed with longitudinal slots separated by bridges.

7. A metal base for a cushion tire, said base comprising a pair of annular side members outwardly formed with under-cut rubber-locking projections, and a series of cross-tying, member-spacing bridges connecting said members and separated by openings in the base.

8. A cushion tire base comprising a one-piece metal ring formed with longitudinal slots separated by bridges which are integral with the adjacent side portions of the base, said base being formed on the outer side with ridges for interlocking with a plastic rubber tire-body.

9. A metal base for rubber cushion tires comprising a cylindrical metal band having continuous side portions and cross-webs at intervals connecting said side portions, said webs and side portions being integral with each other.

In witness whereof I have hereunto set my hand this 17 day of October, 1921.

JOHN R. GAMMETER.